May 10, 1966 R. A. WILFERTH 3,250,636

METHOD AND APPARATUS FOR IMAGE REPRODUCTION WITH THE USE OF A REUSABLE HEAT DEMAGNETIZABLE FERROMAGNETIC IMAGING LAYER

Filed Jan. 2, 1963

INVENTOR.
ROBERT A. WILFERTH

BY Stanley Z. Cole

ATTORNEY 3,250,636

METHOD AND APPARATUS FOR IMAGE REPRODUCTION WITH THE USE OF A REUSABLE HEAT DEMAGNETIZABLE FERROMAGNETIC IMAGING LAYER

Robert A. Wilferth, Pittsford, N.Y., assignor to Xerox Corporation, Rochester, N.Y., a corporation of New York Filed Jan. 2, 1963, Ser. No. 248,920
7 Claims. (Cl. 117—17.5)

The present invention relates generally to the formation or reproduction of images and more particularly to the formation of magnetic images.

Although the magnetic recording of sound has reached a very sophisticated level and the magnetic recording of the electrical signal analog of images has reached a commercial state very recently, there is really no good basic technique for the formation of magnetic images which correspond directly to the original to be reproduced. The closest approach to such a system appears to be facsimile ferromagnetography, in which a stylus is pulsed to selectively magnetize very small spots on a magnetic material as it scans the surface of the material. These pulses correspond to the output pulses of a conventional facsimile transmitter of the type that scans the original to be reproduced with a light source, detecting the lightness or darkness of the original being scanned with a photoelectric cell and pulsing in accordance therewith. Although this type of device may be used to form magnetic images, it obviously requires very expensive and complex equipment including synchronized systems in the facsimile transmitter and the facsimile receiver as well as scanning lights, photoelectric pick ups, amplifiers, pulse generators, transmitters, transmission line connections, receiving detectors, amplifiers, large power supplies and the like. In addition to these difficulties, this type of ferromagnetic copying system also tends to produce a half-tone on the reproduction which conforms to the shape of the magnetic stylus.

Accordingly, it is an objective of this invention to define a novel ferromagnetic imaging technique.

It is also an objective of this invention to describe a method and apparatus for photo-exact reproduction utilizing a magnetic image forming technique capable of high quality reproduction at low cost.

It is yet another objective of this invention to describe a printing technique utilizing a novel method of magnetic image formation.

The above and still further objects, features, and advantages of the present invention will become apparent upon consideration of the following detailed disclosure of the invention, especially when taken in conjunction with the accompanying drawings wherein.

Figure 1:
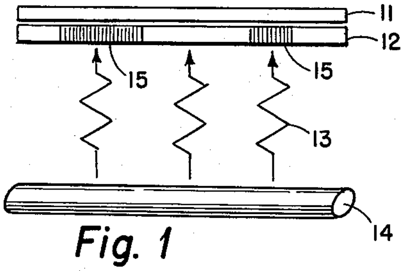
FIGURE 1 is a side sectional view of one embodiment of image formation according to this invention.

Referring now to FIGURE 1, there is illustrated a member 11 upon which the magnetic image is to be formed. Since the basic mechanism of image formation of this invention is the conversion of selected portions of image bearing member 11 from the ferromagnetic to the paramagnetic state by the application of heat to those portions, to bring them up to their Curie point temperature, it is preferable that image bearing member 11 be selected from that class of ferromagnetic materials which have relatively low Curie point temperatures so that excessive amounts of heat will not have to be applied to the image bearing member in order to form the image.

Some exemplary materials of the preferred type include copper zinc ferrite which has a Curie point temperature of 80° C., manganese zinc ferrite, which has a Curie point temperature of 100° C., nickel zinc ferrite, which has a Curie point temperature of 80° C., and nickel zinc ferrite which has been annealed for about 3 days at 950° C. in an oxygen atmosphere which has a Curie point temperature of about 60° C. These exemplary materials are described in greater detail in U.S. Patent 2,452,530 to J. L. Snoek. It should be pointed out at this time, however, that these preferred materials are not critical to the operation of the process because their Curie point temperatures are fairly close to normal room temperatures, since other ferromagnetic materials having much higher Curie point temperatures may be utilized whenever circumstances permit the use of these higher temperatures for image formation. If desired, this ferromagnetic layer may be formed on a supporting substrate.

Ferromagnetic member 11 is placed in face to face contact with the original 12 to be reproduced which may be a printed or typewritten sheet, a photographic film, either positive or negative, or any other similar material, the only requirement being that the image on the original be made up of areas which strongly contrast with the background on the original in its ability to absorb infra-red light and re-radiate heat. All black on white originals and most other originals of various different colors will fulfill this objective since in the case of black printing on a white background the printing will absorb infra-red while the background will not and in the case of originals of other colors, the colors generally differ enough for purposes of giving contrast visibility to the image that either the image or background color will absorb infra-red radiation while the other does not. This two-layer sandwich of the ferromagnetic imaging member 11 and the original 12 is subjected to strong infra-red radiation 13 with a strong infra-red light source 14 of the type in common use in thermographic copiers. Since the infra-red light coming from infra-red lamp 14 is absorbed by the darkened sections 15 of the original 12 and converted to heat the immediately adjacent ferromagnetic layer 11 is heated in image configuration. By selecting an infra-red lamp of sufficient powder depending upon the spacing of the lamp from the original, the character of the original and the type of ferromagnetic layer 11 utilized, the temperature generated by the original will be sufficient to bring those areas of ferromagnetic layer 11 overlying the dark image areas 15 of original 12 to the Curie point temperature, converting these areas to their paramagnetic state so that the paramagnetic and ferromagnetic areas of image bearing layer 11 are exactly divided in image configuration.

Several different techniques may be utilized for magnetizing this ferromagnetic material in image configuration. In one technique image bearing layer 11 is uniformly magnetized prior to exposure from the original so that the heat generated from the original upon its subjection to infra-red radiation merely serves to erase those magnetized areas of image bearing layer 11 over the dark areas of the original thus leaving a negative magnetic image of the original on image bearing layer 11. Alternatively, this magnetic field may be first applied to image bearing member 11 during exposure of the original to the infra-red light source or just after this exposure but prior to the time that image bearing layer 11 has been allowed to cool down below its Curie point temperature. Obviously, all of these techniques utilize the Curie point transition to selectively magnetize image bearing layer 11 in original image configuration. Although the darkened image areas 15 are shown as extending through original 12, as they might in the case of a photographic film, the image areas may also be on either side of the original 12 as seen in FIG. 1 and still generate the required heat. Obviously, if the image is on the lower side of the original 12 as seen in FIGURE 1 it will produce a right reading heat image on image bearing layer 11 while if the original image faces image bearing layer 11 a wrong reading heat image will be produced on layer 11. If the original is in the form of a photographic film it may be either a positive or a negative of the final copy which is desired, and it may be placed against the image bearing layer 11 so as to produce either a wrong or a right reading image depending upon which side of the original is in contact with image bearing layer 11.

After image formation ferromagnetic image bearing layer 11 is removed from contact with original 12 and developed by the deposition thereon of a colored, particulate, magnetically attractable material. Since this particulate material selectively attracted to the magnetized areas of image bearing layer 11 a visible particle image is formed on the surface of the image bearing layer 11 which corresponds both to the original and to the latent magnetic image which has been produced in the first step of the process. This particulate image may be viewed in situ on the layer 11 and dusted off for reuse or the particulate image may be fixed to layer 11 as by spraying with an adhesive overcoating or by melting the particles with heat or solvents to fuse them to image bearing layer 11 or alternatively the particulate image may be transferred to a second layer such as ordinary bond paper or the like and permanently affixed thereto in the same manner. The second layer may also be a blank for a printed circuit in which case the particulate image after transfer and fixing serves as an etching resist. In this instance the color of the particles is immaterial and even a transparent developer may be used. Transfer of the developed particle image from image bearing member 11 to a sheet of copy paper is accomplished by bringing the copy paper into contact with the particle image and applying an attracting magnetic force behind the coy paper which is strong enough to overcome the attractive force of the image bearing member 11 on the particle. Many other techniques of transfer may also be utilized. For example, the particle image may be transferred to an adhesive tape such as the well known Scotch Brand Cellophane tape or other materials both more and less adhesive by merely bringing the stocky side of the tape into contact with the particle image so that the tape picks up the image. In a third transfer technique, the original particles utilized are both magnetically attractable and electrostatically attractable, so that once the image is formed on ferromagnetic layer 11 it may be transferred to a sheet of copy paper with an attracting electrostatic field which is opposite in polarity to an initial charge which is uniformly applied to the particles. This type of transfer is well known and is widely used in the field of xerography with the transfer of particles which are electrostatically attractable to a copy sheet, and is more fully described in U.S. Patents 2,576,047 to Schaffert and 2,626,865 to Mayo. In this instance, then, a composite particle is generally utilized which may, for example, include a magnetically attractable core such as carbonyl iron, and an outer coating of an insulating resin of the type described in U.S. Patent 2,891,011 to Insalaco or Reissue Patent 25,136 to Carlson. After development of the magnetic image formed on image bearing layer these particles may be given a uniform charge of one polarity by virtue of corona discharge from a wire filament or filament array held at a high potential which is spaced slightly from the powder layer. This type of charging device is described more fully in U.S. Patents 2,588,699 to Carlson and 2,778,946 to Mayo among others.

In the event that it is desired to produce both a positive and a negative image or in the event that negative is produced on image bearing member 11 whereas a positive final copy is desired, the magnetic latent image on image bearing member 11 may be developed by bringing this member into contact with a sheet of paper uniformly coated with magnetically attractable colored particles. In this event, complementary images will be produced on image bearing member 11 and on the sheet carrying the uniform coating of developer particles. Either or both of these images may then be utilized as desired by fixing the remaining image on the paper carrier or donor and by transferring its complementary image from magnetic image bearing member 11 to a second paper sheet and fixing it on this second sheet.

Figure 2:
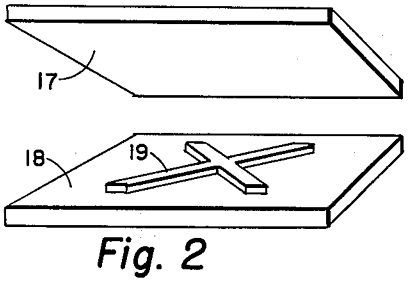
FIGURE 2 is a perspective view of a second image formation technique according to this invention.

In FIGURE 2, there is illustrated a second technique for the selective application of heat in image configuration to a ferromagnetic member in order to convert portions of it to the paramagnetic state wherein the converted portions correspond to the image which is desired to reproduce. In this case, a ferromagnetic image bearing member 17, which may be of the same material described in connection with image bearing member 11 of FIGURE 1, is selectively heated by being brought in face to face contact with a heated pattern on platen 18. In this instance, a raised letter 19 is illustrated as the selective heating means. In order to insure selective heating of only that area of image bearing member 17 which corresponds to the raised letter 19, the raised letter may be formed of a material such as copper, aluminum, steel, or the like which is a good conductor of heat while the plate is fabricated of a heat insulating material such as wood. Obviously, if the platen is fabricated in this manner, the letter or any other heated member which is shaped in the form of the image to be reproduced need not necessarily be raised above the surface of the platen but may also be set in flush with the plate. If heat spreading is not a critical consideration or if the heating step is carried out by a careful operator the platen may be eliminated entirely thus leaving the image forming member similar to a branding iron of the type used to brand cattle in the Old West. Obviously many different techniques may be utilized employing the types of heating described in connection with FIGS. 1 and 2. For example, a first image may be formed on a uniformly magnetized film magnetic layer such as 11 by the technique described in FIG. 1 and then a second image may be superimposed by the technique described in FIG. 2 so that two different images or sets of information may be printed onto one form. Or alternatively, the heating platen described in FIG. 2 instead of being made up of a number of fixed letters or symbols may be composed of a matrix in which a number of small pin-like, resistance heaters are arranged in rows and columns across the surface of the platen and are selectively energized in combination so as to produce any desired number, letter or arbitrary signal. In short, then, almost any technique for heating the ferromagnetic layer 11 in image configuration may be utilized and the heat may be applied to either image areas or non-image areas producing either a negative or a positive of the image to be reproduced as desired by the operator.

Figure 3:
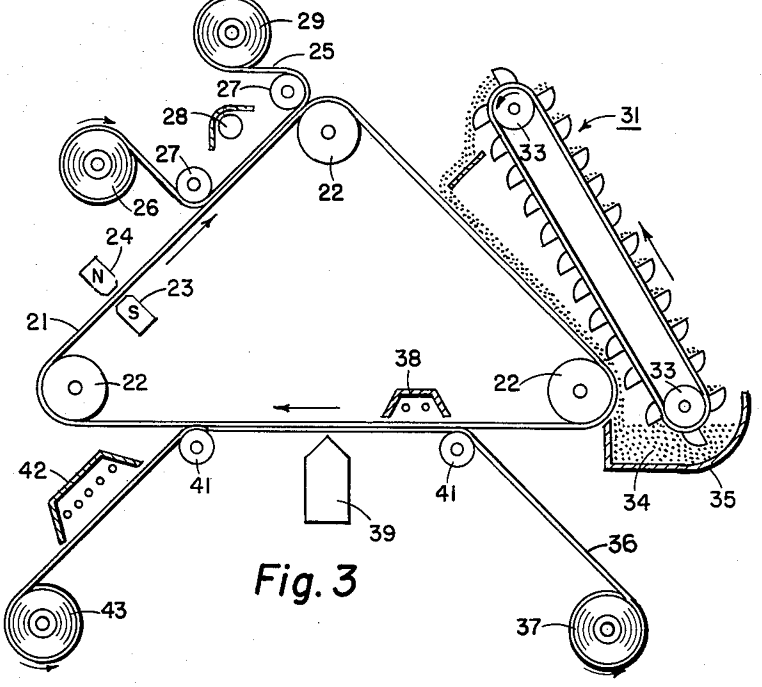
FIGURE 3 is a side view of an automatic continuous high speed copying device incorporating the image formation technique of this invention.

In FIG. 3, there is illustrated an automatic continuous machine for the reproduction of original images by the technique described in connection with the FIGS. 1 and 2 embodiments. In this case, a ferromagnetic member 21 similar to members 11 and 17 of FIGS. 1 and 2 respectively, in the form of an endless belt is entrained about three rollers 22 at least one of which is driven to move the belt in a direction indicated by the arrow on the drawing. In this instance, the belt is first magnetized under the influence of a magnetic field from magnets 23 and 24 and then passes from between the magnets into contact with an original to be reproduced in the form of a web 25 from supply roll 26 which is pressed up against the magnetized belt 21 by two rollers 27. The original, moving at the same peripheral speed as the belt, is separated from the belt after exposure by an infra-red light source 28 and is then rewound on a take-up roll 29. Although the illustrated original is in the form of an endless web, as it might be if the original were a photographic film, it also should be made clear at this point that the original may be made up of cut sheets of the size corresponding to ordinarily business letters, advertisements, memos, and the like, with each being individually fed into contact with endless belt 21 just prior to exposure by an infra-red light source, and that the image might also be formed by the technique described in connection with FIG. 2 above. After the infra-red light has selectively converted portions of the endless ferromagnetic belt to their paramagnetic state in image configuration by heating the dark areas of the original, which in turn heats portions of the magnetic belt, the belt moves on to development station generally designated 31 where colored particulate magnetically attractable material of the type described above is cascaded over its surface so as to develop the latent magnetic image on the belt. In this case, an endless belt bucket conveyor 32 entrained about two rollers 33; at least one of which is driven, is mounted so as to pick up developing particles 34 from a trough 35 which holds the particles and dumps them down over the belt surface. The belt, carrying a developed particulate image, then passes about the lower right-hand roller 22 as seen in FIG. 3 coming into contact with a sheet of copy paper 36 from a supply roll 37. Once web 36 and endless belt 21 are in face to face relationship, the belt is heated by a resistance type heating unit 38 which serves to convert any remaining ferromagnetic areas on the belt to the paramagnetic condition thus effectively demagnetizing or erasing the whole magnetic image and eliminating the magnetic field which serves to hold the particles to the belt. Obviously, if fusible resinous particles are used to develop the belt, their melting point must be higher than the Curie point of the belt. The belt and the copy sheet then pass over a magnet 39 which serves to assure removal of the particle image from the belt and its deposition on the copy sheet. Subsequent to this transfer, the copy paper, which is held against the endless belt by two rollers 41, passes under a fixing station 42 and is then rewound on a take-up reel 43. In this instance, a resistance heater type fixing unit is illustrated since the use of an iron core resinous developing powder is contemplated and this type of fixing unit has proved most effective in fusing resinous powders of this type to paper. The belt then continues around rollers 22 for reuse.

If desired, erasure and re-exposure of the belt may be eliminated from the process and the belt with the pattern of ferromagnetic and paramagnetic areas may be utilized in a manner analogous to a printing plate. In other words, after formation of the magnetic latent image on the belt, it is repeatedly developed with magnetically attractable powders and the powder image is transferred to a second copy sheet after each development thus allowing for the formation of multiple copies with only a two-step process. If this technique is utilized, it is preferable to use an adhesive or electrostatic transfer method of the type described above since the magnetic image on the belt may not be erased.

The particular apparatus described in this specification is intended as illustrative only. Various modifications will occur to those skilled in the art and are intended to be encompassed within the following claims.

What is claimed is:

1. An image reproduction method comprising applying a uniform magnetic field to a ferromagnetic imaging layer, exposing said magnetized ferromagnetic imaging layer to a pattern of heat conforming to the shape of an image to be reproduced, said heat being sufficient to raise the heated portions of the layer above the Curie point temperature of said ferromagnetic imaging layer thereby forming a latent magnetic image on said imaging layer, developing said latent magnetic image by depositing finely divided magnetically attractable material on the surface of said ferromagnetic imaging layer, uniformly heating said imaging layer above its Curie point temperature after development to uniformly demagnetize it and then transferring the loosely adhering magnetically attractable material from said imaging layer to a transfer layer.

2. A method according to claim 1 including the step of bringing said transfer layer into face-to-face contact with said imaging layer and transferring said loosely adhering particles on said imaging layer by applying a magnetic field of sufficient intensity behind said transfer layer to transfer said particles to said transfer layer in image configuration.

3. A method according to claim 1 including electrostatically charging said magnetically attractable finely divided developing particles to a first polarity before transfer and then transferring said loosely adhering particles from said imaging layer by bringing said transfer layer into face-to-face contact with said imaging layer and, after demagnetization, applying an electric field to said particles of a polarity such that they will transfer to said transfer web.

4. A method according to claim 1 including transferring said loosely adhering particles to said transfer layer by bringing a transfer layer with an adhesive surface into face-to-face contact with the surface of said imaging layer bearing said loosely adhering particles.

5. A method according to claim 1 including the step of bringing said transfer layer into contiguous relationship with said imaging layer prior to the uniform application of heat to said imaging layer whereby any particles released by the demagnetization of said imaging layer will fall onto the surface of said transfer layer.

6. An image forming apparatus comprising a ferromagnetic imaging member, means to apply a uniform magnetic field to said imaging member, means to selectively apply heat to said imaging member in the configuration of an original to be reproduced, said heating means having a capacity sufficient to raise the heated areas above the Curie point temperature of said imaging member, means to deposit finely divided, magnetically attractable developing particles on said imaging member to form a visible particle image on said imaging member, means to uniformly heat said imaging member above its Curie point temperature after development whereby said imaging member is demagnetized and said finely divided magnetically attractable particles loosely adhere to said imaging member by Van der Waal's forces, means to bring a transfer layer into contiguous relationship with said imaging layer, means to transfer said loosely adhering particles from said imaging layer to said transfer layer and means to move said imaging layer past said magnetizing means, said selective heating means, said particle depositing means, said uniform heating means, and said transfer means in their named order.

7. An image forming apparatus comprising an endless imaging belt with a ferromagnetic imaging layer thereon, magnetizing means to uniformly magnetize said ferromagnetic layer, means to selectively apply heat to said imaging member in the configuration of an image to be reproduced, said heating means having a capacity sufficient to raise the heated areas of said ferromagnetic layer, above its Curie point, developing means adapted to deposit finely divided magnetically attractable developing particles on said endless belt, means to uniformly heat the ferromagnetic layer of said endless belt above its Curie point, said uniform heating means being positioned inside said endless belt means to bring a transfer layer into contiguous relationship with the particle-covered outside surface of said endless belt, means to transfer magnetically attractable particles from said endless belt to said transfer layer and means to move said endless belt past said uniform magnetizing means, said selective heating means, said developing means, said uniform heating means, and said transfer means in their named order.

(References on following page)

References Cited by the Examiner

UNITED STATES PATENTS

| | | | |
|---|---|---|---|
| 2,793,135 | 5/1957 | Sims et al. | |
| 2,843,084 | 7/1958 | Hayford | 117—17.5 |
| 2,857,290 | 10/1958 | Bolton. | |
| 2,890,968 | 6/1959 | Giaimo | 250—65 |
| 2,999,035 | 9/1961 | Sahler | 250—65 |
| 3,052,564 | 9/1962 | Kulesza. | |
| 3,097,297 | 7/1963 | Sahler | 250—65 |
| 3,145,071 | 8/1964 | Vance | 250—65 |

RALPH G. NILSON, *Primary Examiner.*

WILLIAM F. LINDQUIST, *Assistant Examiner.*